United States Patent
Webster

[15] 3,666,787
[45] May 30, 1972

[54] PREPARATION OF DIIMINOSUCCINONITRILE FROM HYDROGEN CYANIDE, CHLORINE AND TRIMETHYLAMINE

[72] Inventor: Owen Wright Webster, Wilmington, Del.

[73] Assignee: E. I. du Pont de Nemours and Company, Wilmington, Del.

[22] Filed: Mar. 18, 1970

[21] Appl. No.: 20,820

Related U.S. Application Data

[63] Continuation-in-part of Ser. No. 707,459, Feb. 23, 1968, Pat. No. 3,564,039, and a continuation-in-part of Ser. No. 670,763, Sept. 26, 1967, abandoned.

[52] U.S. Cl. ....................................................260/465.5
[51] Int. Cl. .....................................................C07c 121/20
[58] Field of Search .........................................260/465.5

[56] References Cited

UNITED STATES PATENTS

| | | | |
|---|---|---|---|
| 2,499,441 | 3/1950 | Woodward | 260/465.5 |
| 3,564,039 | 2/1971 | Webster | 260/465.5 |

*Primary Examiner*—Joseph P. Brust
*Attorney*—James H. Ryan

[57] ABSTRACT

The process of synthesizing diiminosuccinonitrile by the liquid-phase reaction of hydrogen cyanide with (a) chlorine or cyanogen chloride and (b) a tertiary amine or a soluble cyanide salt.

13 Claims, No Drawings

PREPARATION OF DIIMINOSUCCINONITRILE FROM HYDROGEN CYANIDE, CHLORINE AND TRIMETHYLAMINE

RELATED APPLICATIONS

This application is a continuation-in-part of my copending application Ser. No. 707,459, filed Feb. 23, 1968, now U.S. Pat. No. 3,564,039, as a continuation-in-part of my application Ser. No. 670,763, filed Sept. 26, 1967, and now abandoned.

BACKGROUND OF THE INVENTION

1. Field of the Invention

This invention is concerned with a new process for the preparation of diiminosuccinonitrile.

2. Relationship to the Art

Diiminosuccinonitrile is claimed in my copending application Ser. No. 707,459, where it is shown as prepared by the reaction of hydrogen cyanide with cyanogen in the presence of a basic catalyst.

Cyanogen has been made by reacting hydrogen cyanide with chlorine or cyanogen chloride at temperatures above 200° C. (U.S. Pat. No. 2,399,361).

SUMMARY AND DETAILS OF THE INVENTION

There has now been discovered an improved process for the preparation of diiminosuccinonitrile by the liquid phase reaction of hydrogen cyanide with (a) chlorine or cyanogen chloride and (b) a tertiary amine or a soluble cyanide salt.

This process involves the in situ preparation of cyanogen. While it is not necessary to isolate the cyanogen, it is possible to do so, and accordingly the reaction can be considered chemically as a two-step process. Cyanide is consumed in both steps, and the steps may be made to take place consecutively rather than simultaneously by adding the last part of the hydrogen cyanide after the first step has taken place.

Tertiary amines suitable for use in this process are compounds composed solely of carbon, hydrogen and nitrogen and containing from three to 30 carbon atoms and from one to four nitrogen atoms, each nitrogen atom having each of its three bonds connected directly to a separate aliphatic carbon atom, said compounds being free of aliphatic carbon-to-carbon unsaturation (ethylenic, dienic or acetylenic). Such tertiary amines include trimethylamine, triethylamine, N,N-dimethylcyclohexylamine, tetraethylmethylenediamine, N,N-dimethylbenzylamine, tribenzylamine, tris(phenethyl)-amine, N-methylpiperidine, triethylenediamine, hexamentylenetetramine, and the like. These include compounds of the formula $R_3N$, in which N represents one equivalent of nitrogen in the tertiary amine and each R represents attachment of the nitrogen atom to a separate aliphatic carbon atom. Thus, the R's may be separate lower alkyl groups of up to six carbon atoms or arylalkyl groups of up to 10 carbon atoms or the R's may represent alkyl or alkylene linkages in tertiary amines containing more than one nitrogen atom. Preferred tertiary amines are those less readily oxidized by chlorine and for this reason trimethylamine, which contains only primary hydrogen atoms, is particularly preferred.

Soluble cyanide salts suitable for use in this invention may be represented by the formula MCN, in which M is an alkali metal such as lithium, sodium, potassium, rubidium and cesium or a tetra(lower alkyl)ammonium group such as tetramethylammonium or tetraethylammonium.

As illustrated in the examples which follow, the embodiments of this invention may be severally described by the following equations, in which $R_3N$ and M are defined as above.

When (a) is chlorine and (b) is a tertiary amine, the process is:

Step 1  $2HCN + Cl_2 + 2R_3N \longrightarrow (CN)_2 + 2R_3NHCl$
Step 2  
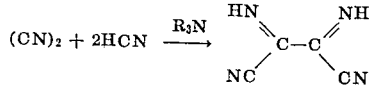

When (a) is chlorine and (b) is a soluble cyanide salt, the process is:

Step 1  $Cl_2 + 2MCN \longrightarrow (CN)_2 + 2MCl$
Step 2  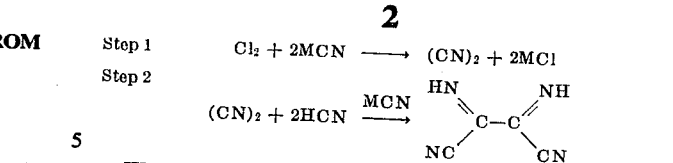

When (a) is cyanogen chloride and (b) is a tertiary amine, the process is:

Step 1  $HCN + ClCN + R_3N \longrightarrow (CN)_2 + R_3NHCl$
Step 2  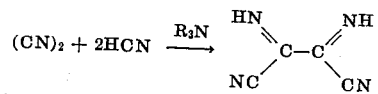

When (a) is cyanogen chloride and (b) is a soluble cyanide salt, the process is:

Step 1  $ClCN + MCN \longrightarrow (CN)_2 + MCl$
Step 2  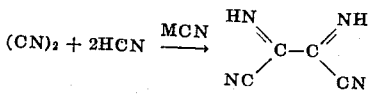

Since cyanogen can be isolated from Step 1, the part of the process dealing with preparation of cyanogen can be expressed collectively as a process for the preparation of cyanogen by the reaction of (c) a soluble cyanide salt, or (d) hydrogen cyanide and a tertiary amine with (e) chlorine or (f) cyanogen chloride.

The process of this invention may be carried out at temperatures in the range from −80° to 0° C. At temperatures above −20° C. the diiminosuccinonitrile product is slowly consumed in a side reaction of conversion to diaminomaleonitrile when excess hydrogen cyanide is present.

When Step 1 is operated alone, the temperature range from −80° to +100° c. may be used. This is broader than the −80° to 0° C. range which must be observed when Step 2 is taking place. When cyanogen is to be isolated, it may be removed from the liquid reaction mixture in the form of a gas by operating at reduced pressure.

Pressure is not a critical variable in this process and pressures as high as 1,000 atmospheres and as low as 0.001 atmosphere are fully operable. Atmospheric pressure is preferred for convenience.

The time of reaction varies depending on the temperature employed. At temperatures in the range from −10° to 0° C. reaction proceeds substantially as fast as the reactants can be combined. At −40° C. reasonable yields are obtained in about 4 hours and at −80° C. one or more days may be required to provide practical yields of diiminosuccinonitrile.

No solvent or liquid reaction medium is required and the process may be carried out using neat reactants. However, since solutions of cyanides in hydrogen cyanide are known to be explosive (V. Migrdichian, "Organic Cyanogen Compounds", Reinhold Publishing Corporation, 1947, p. 349), it is preferred to employ an aprotic solvent or diluent which is inert to the reactants and products. Preferred aprotic solvents include hydrocarbons such as toluene and xylene; hydrogenated hydrocarbons such as dichloromethane, dichloroethane, and Freons, e.g., $CCl_3F$, $CCl_2F_2$, $CHCl_2F$, $CHClF_2$, $C_2Cl_3F_3$, and $C_2Cl_2F_4$; amides such as dimethylformamide and dimethylacetamide; ethers such as tetrahydrofuran and dioxane and sulfones such as dimethylsulfone and tetramethylenesulfone. Solvents which are least readily attacked by chlorine are preferred.

While it is not essential to remove the last traces of water from the hydrogen cyanide employed in this process, it is preferable to avoid the presence of any substantial amounts of protic liquids such as water and methanol in the reaction.

The equations above indicate the several preferred molar proportions in which the reactants may be combined in carrying out the process of this invention. However, in practice the amounts of the several reactants which can be brought together under the conditions defined above may be varied widely. For example, as much as a 10-molar excess of cyanogen chloride, tertiary amine, or soluble cyanide salt may be employed. It is preferred to avoid molar excesses of chlorine since excess chlorine reacts with the diiminosuccinonitrile product. Excess hydrogen cyanide may be used, but it is preferable to avoid excess hydrogen cyanide when operating at −20° to 0° C. because it slowly reduces diiminosuccinonitrile to diaminomaleonitrile.

The order of addition of the reactants is not critical but for best yields of product, when chlorine is used, it is preferred that the hydrogen cyanide be present before the chlorine is introduced. The tertiary amine or soluble cyanide may be added before or after the other reactants but it is preferred to add it before.

The process is suitable for carrying out on a batch process as illustrated below or on a continuous basis. For the latter, a tubular reactor may be employed with suitable means for introducing the reactants, withdrawing the products, and controlling the temperature and flow of the reaction mixture.

EMBODIMENTS OF THE INVENTION

There follow some nonlimiting examples illustrative of this invention in more detail. Example 8 demonstrates that the process can be carried out in two separate steps, if desired, while Example 9 shows that cyanogen can actually be separated, also if desired.

EXAMPLE 1

A solution of 20 ml. of hydrogen cyanide in 200 ml. of dichloromethane was cooled to −40° C. and 7.1 g. of chlorine was added. The mixture was warmed to 0° C. and 0.5 g. of tetraethylammonium chloride was added. After 15 minutes, the solution was cooled and held at −40° to −20° C. and trimethylamine (21.0 ml.) was added slowly over a 2-hour period. The diiminosuccinonitrile and trimethylammonium chloride which formed were collected on a filter. The trimethylammonium chloride was removed by washing with 200 ml. of ice cold water. There remained 2.29 g. of diiminosuccinonitrile which was characterized by its infrared spectrum: 3020, 1590, 1270, and 930 cm$^{-1}$.

EXAMPLE 2

To a solution of 25 ml. of hydrogen cyanide, 22.0 ml. of trimethylamine and 200 ml. of dichloromethane at −80° C. was added 7.1 g. of chlorine over a period of 1 hour. The mixture was then held at −40° to −30° C. for 3 hours. The solid product was collected on a filter and washed with 200 ml. of ice water. There remained 5.85 g. of diiminosuccinonitrile.

EXAMPLE 3

To a solution of 25 ml. of hydrogen cyanide, 21 ml. of trimethylamine and 200 ml. of dichloromethane at −10° C. was added 7.1 g. of chlorine over a period of 20 minutes. The solution was stirred for 40 minutes and was then filtered. The precipitate was washed two times with 50 ml. of ice water to give 5.20 g. of diiminosuccinonitrile.

EXAMPLE 4

To a solution of 306 ml. (8.00 moles) of hydrogen cyanide, 387 ml. (4.00 moles) of trimethylamine and 2.5 liters of toluene at −20° C. was added 145 g. (2.04 moles) of chlorine over a period of 40 minutes. The mixture was stirred for 0.5 hour at −15° C. and was filtered. The precipitate was washed with toluene, then twice with 500 ml. of ice water. There remained 138 g. of diiminosuccinonitrile.

EXAMPLE 5

To a solution of 28.5 ml. of triethylamine, 10 ml. of hydrogen cyanide and 100 ml. of dichloromethane at −40° C. was added 7.1 g. of chlorine over a period of 3 hours. The insoluble product was collected on a filter and washed with ice water. There remained 10 mg. of diiminosuccinonitrile.

EXAMPLE 6

To a suspension of 2.68 g. of KCN in 20 ml. of hydrogen cyanide at −14° C. was added 1.56 g. of chlorine. The mixture was stirred for 15 minutes, diluted with 100 ml. of dichloromethane, cooled to −70° C. and then filtered. The filtrate was evaporated to dryness leaving 50 mg. of diiminosuccinonitrile.

When cyanogen chloride is substituted for chlorine in the procedure of Example 6, diiminosuccinonitrile is also obtained.

EXAMPLE 7

To a solution of 20 ml. of hydrogen cyanide, 10.5 ml. of trimethylamine and 200 ml. of dichloromethane at −80° C. was added 6.15 g. of cyanogen chloride. The mixture was stirred at −20° to −10° C. for 3 hours. It was then filtered and the precipitate washed with ice water. There remained 1.14 g. of diiminosuccinonitrile.

EXAMPLE 8

Two-Step Reaction

A solution of 20 ml. of hydrogen cyanide, 53 ml. of trimethylamine and 200 ml. of toluene was cooled to −40° C. Chlorine (11.4 ml. liquid) was allowed to vaporize and then condense into the solution at −40° C. After 1 hour, the mixture was filtered and the filtrate, which contained the cyanogen produced in the reaction, was treated with an additional 20 ml. of hydrogen cyanide, still at −40° C. In 3 hours, 8.1 g. of diiminosuccinonitrile precipitated and was recovered and identified by its infrared spectrum.

EXAMPLE 9

Isolating Cyanogen

A solution of 20 ml. of hydrogen cyanide, 43.5 ml. of trimethylamine and 200 ml. of toluene was cooled to −40° C. and chlorine (11.0 ml. liquid) was allowed to condense into the solution. After 1 hour at −30° to −25° C., the pressure over the system was reduced to 50 mm. Hg and the gas which vaporized was condensed in a trap cooled with liquid nitrogen. The condensate was then allowed to evaporate and expand into a 5.5 liter evacuated container at 25° C. The pressure rose to 572 mm. Hg (absolute). Mass spectral analysis showed the product to contain 72 percent cyanogen (0.12 mole), 19 percent hydrogen cyanide, 6 percent air and 1 percent cyanogen chloride. Pure cyanogen is obtained from the product by fractionation.

Since obvious modifications and equivalents in the invention will be evident to those skilled in the chemical arts, I propose to be bound solely by the appended claims.

The embodiments of the invention in which an exclusive property of privilege is claimed are defined as follows:

1. The process of preparing diiminosuccinonitrile which comprises reacting, in liquid phase, hydrogen cyanide with:
   a. at least one of chlorine and cyanogen chloride; and
   b. at least one of the groups consisting of (1) tertiary amines composed solely of carbon, hydrogen and nitrogen and containing from three to 30 carbon atoms and from one to four nitrogen atoms, each nitrogen atom having each of its three bonds connected directly to a separate aliphatic carbon atom, said compounds being free of aliphatic carbon-to-carbon unsaturation, and (2) cyanide salts of the formula MCN where M is an alkali metal or a tetra(lower alkyl)ammonium group,
   at a temperature in the range −80° to 0° C. when reaction with (b) is being carried out.

2. The process of claim 1 accomplished in an inert aprotic diluent.

3. The process of claim 1 wherein reactions with (a) and (b) are carried out simultaneously.

4. The process of claim 1 wherein reactions with (a) and (b) are carried out sequentially.

5. The process of claim 4 wherein the temperature during reaction with (a) is in the range −80° to +100° C.

6. The process of claim 1 wherein hydrogen cyanide is reacted with chlorine, tetraethylammonium chloride and trimethylamine.

7. The process of claim 6 accomplished in an inert aprotic diluent.

8. The process of claim 1 wherein hydrogen cyanide is reacted with chlorine and trimethylamine or triethylamine.

9. The process of claim 8 accomplished in an inert aprotic diluent.

10. The process of claim 1 wherein hydrogen cyanide is reacted with chlorine and an alkali metal cyanide.

11. The process of claim 10 accomplished in an inert aprotic diluent.

12. The process of claim 1 wherein hydrogen cyanide is reacted with cyanogen chloride and trimethylamine.

13. The process of claim 12 accomplished in an inert aprotic diluent.

* * * * *